United States Patent
Ning

(10) Patent No.: US 10,641,993 B1
(45) Date of Patent: May 5, 2020

(54) COMPACT WIDE ANGLE LENS WITH LOW DISTORTION

(71) Applicant: Alex Ning, Carlsbad, CA (US)

(72) Inventor: Alex Ning, Carlsbad, CA (US)

( * ) Notice: Subject to any disclaimer, the term of this patent is extended or adjusted under 35 U.S.C. 154(b) by 47 days.

(21) Appl. No.: 15/872,069

(22) Filed: Jan. 16, 2018

Related U.S. Application Data

(60) Provisional application No. 62/448,002, filed on Jan. 19, 2017.

(51) Int. Cl.
   *G02B 9/60* (2006.01)
   *G02B 13/00* (2006.01)
   *G02B 9/62* (2006.01)
   *G02B 1/04* (2006.01)

(52) U.S. Cl.
   CPC .......... *G02B 13/0045* (2013.01); *G02B 9/60* (2013.01); *G02B 9/62* (2013.01); *G02B 1/04* (2013.01)

(58) Field of Classification Search
   CPC .................................... G02B 9/60; G02B 9/62
   See application file for complete search history.

(56) References Cited

U.S. PATENT DOCUMENTS

| | | |
|---|---|---|
| 4,329,024 A | 5/1982 | Rogers |
| 7,023,628 B1 | 4/2006 | Ning |
| 7,929,221 B2 | 4/2011 | Ning |
| 7,940,478 B2 | 5/2011 | Take |
| 8,503,110 B2 | 8/2013 | Oshita |
| 8,547,423 B2 | 10/2013 | Ning |
| 8,659,841 B2 | 2/2014 | Enomoto |
| 8,964,312 B2 | 2/2015 | Kawamura |
| 2011/0115963 A1 | 5/2011 | Sueyoshi |
| 2014/0354858 A1 | 12/2014 | Kawamura et al. |
| 2015/0205080 A1 | 7/2015 | Yokoyama |
| 2017/0184814 A1 | 6/2017 | Ning |

*Primary Examiner* — Jack Dinh
(74) *Attorney, Agent, or Firm* — Mark Wisnosky

(57) ABSTRACT

A thermally stable, compact, wide angle lens design has been described. The lens is comprised of two lens groups. The first group, nearest the object, has positive power and provides most of the focusing power of the entire lens assembly. The first group is made of either a single lens element or a doublet. The positively powered lens element in group 1 is made of thermally stable materials such as optical glasses. The second lens group is comprised of four aspheric lens elements. The image surface of the last element, nearest the image plane, is a complex aspherical surface. The lens design satisfies a list of 8 parametric equations.

18 Claims, 5 Drawing Sheets

COMPACT WIDE ANGLE LENS WITH LOW DISTORTION

CROSS-REFERENCE TO RELATED APPLICATIONS

This application claims priority to U.S. Provisional Application 62/448,002, titled Compact Wide Angle Lens with Low Distortion, filed Jan. 19, 2017 by the same inventor and currently pending.

STATEMENT REGARDING FEDERALLY SPONSORED RESEARCH OR DEVELOPMENT

Not Applicable.

BACKGROUND OF THE INVENTION

Technical Field

The invention relates to thermally stable wide-angle lenses, having high image quality across the entire field of view in a compact form factor.

Related Background Art

Digital imaging cameras use solid-state image sensors such as CCD or CMOS imagers to convert optical images into electronic signals. As the resolution of the imagers increases, there is a continuous need for optical lenses with increased performance. An important characteristic of the lens is the ability to produce high-resolution images across a wide field of view with high image quality across the entire field of view. Another important characteristic is to produce such high-resolution images using a lens that is of a compact size. The lenses are increasing being incorporated into a variety of electronic devices including mobile phones, cameras, sports cameras, computers and computer peripherals. Incorporation of the lenses into new devices also places new environmental performance requirements upon the lens. The lens must be compact and light, to be used in portable devices, and must maintain high performance characteristics.

The quality and pixel density of very small imaging sensors is continuously improving. The sensors are used in machine vision, medical, cell phone and automotive applications. In many cases low distortion is critical to proper functioning in the intended application. These lenses are being used more and more in consumer application where literally millions of such lens systems must be easily produced at consistent high quality and at low cost. Custom lens features required to produce low distortion must be designed such that they are also easy to manufacture. The lenses also are now subject to more extremes in environment. A lens that exhibits low distortion and performs consistently across a wide and rapidly changing temperature range is required.

There is a need for new lens designs that exhibit high image quality over a wide field of view. The lens is a compact lens and maintains optical performance over a wide range of, and rapidly changing, temperatures.

BRIEF SUMMARY OF THE INVENTION

The objective of this invention is to provide high performance imaging lenses in a compact form factor and with improved thermal stability. There are two lens groups from the object side to the image side (left to right in the examples presented).

Group 1: This is the first lens group, nearest the object. It has positive power. This group comprises 1 or 2 lens elements made from materials insensitive to environmental temperature changes. In the preferred embodiment group one elements are made from optical glasses. Optical glasses have lower dn/dT coefficients than that of plastic materials in terms of absolute values. Typical dn/dT for plastic optical materials is about $-110 \times 10^{-6}$/C from 0 to 50 C. A very thermally sensitive glass material such as H-FK61 from CDGM catalog is only about $-7 \times 10^{-6}$/C. In this example, the worst glass is almost 20× more stable than the typical plastic. In the first preferred embodiment, this group is made of a single glass element. In other preferred embodiments, this group comprises a doublet with 2 glass elements cemented together to form a cemented doublet. In other embodiments the positively powered elements of the first group are formed using more environmentally stable materials such as optical glasses while the other lens elements are made from less stable materials such as optical plastics. The first group provides most of the focusing power of the entire lens assembly. Selecting lens elements that provide most of the focusing power, and, that are made of high thermal stability material has been found to improve the thermal stability of the entire lens assembly. In a preferred embodiment, the absolute value of the change in refractive index with temperature ($|dn/dT|$) is less than $7 \times 10^{-6}$/C.

Group 2: This group also has positive power comprising 4 aspherical lens elements. This group provides corrections of aberrations of the Group 1. An aspheric element is defined as lens element having at least one aspheric surface, which is generally described by the following well-known equation:

$$z(r) = \frac{cr^2}{1 + \sqrt{1-(1+k)c^2r^2}} + \alpha_1 r^2 + \alpha_2 r^4 + \alpha_3 r^6 + \alpha_4 r^8 + \alpha_5 r^{10} + \alpha_6 r^{12} + \alpha_7 r^{14} + \alpha_8 r^{16} \quad (1)$$

where z is the sag height relative to the vertex of the surface at a distance r from the vertex, $c=1/R$, where R is the radius of the surface, k is the conic constant and $\alpha i$ (i=1, 2 . . . 8) are the various higher order aspheric coefficients.

One of the aspheric elements of Group 2 has a complex surface profile. The definition of a complex aspheric surface is that the local surface derivative changes sign at least once going from center to the edge of the lens element as shown below in FIG. 1. In preferred embodiment the complex aspheric surface is the last optically powered surface facing the image plane (not including any flat filter or sensor cover glass).

The overall effective focal length of the lens assembly is F. The group 1 has an effective focal length of F1, and the group 2, F2. The following conditions are satisfied:

$$F1 <= F2 \quad (2)$$

$$1 <= F1/F <= 1.8 \quad (3)$$

$$F2/F >= 1.8 \quad (4)$$

In preferred embodiments the first element of Group 2 has positive power. The following condition is satisfied:

$$V21 > 55 \quad (5)$$

Where V21 is the Abbe number of the first element of Group 2.

The second element of the Group 2 has negative power. The following condition is satisfied:

$$V22 < 30 \quad (6)$$

Where V22 is the Abbe number of the second element of Group 2.

In preferred embodiments the third element of Group 2 has positive power. The following condition is satisfied:

$$V23 > 55 \quad (7)$$

Where V23 is the Abbe number of the third element of Group 2.

The fourth element of the Group 2 is a complex asphere. The following condition is satisfied:

$$20 < V24 < 60 \quad (8)$$

Where V24 is the Abbe number of the fourth element of Group 2. That is, V24 is selected on the basis of optical performance from an Abbe number range of 20 to 60 . . . .

Total track length (TTL) of the lens assembly defined as the distance from the first group first element object side surface vertex to the image plane when focused at infinity satisfies the following condition:

$$TTL/IH < 2.5 \quad (9)$$

Where IH is the image height at the maximum field. When this condition is satisfied, the lens is compact. In another embodiment the conditional equation:

$$TTL/IH < 2.0 \quad (10)$$

is satisfied.

In one embodiment the lens elements of group 1 are made of glass and the lens elements of group 2 are made of plastic. A preferred embodiment satisfies the conditional equation:

$$|dn/dT| = <7 \times 10^{-6}/C \quad (11)$$

where |dn/dT| is the absolute value of the change in the refractive index (at d-line) of group 1 positive powered lens element per degree Centigrade in the temperature range of −20 to +60 C.

Optical filters and cover glasses for the image sensor are optionally added after the second lens group.

Example details of embodiments of the lens design are shown in the four examples. However, the lens may include designs beyond these four examples and more generally described by the parametric equations and the enclosed claims.

All of the examples satisfy the descriptions and parametric equations discussed above. The specific examples are not intended to limit the inventive concept to the example application. Other aspects and advantages of the invention will be apparent from the accompanying drawings and detailed description.

DETAILED DESCRIPTION OF THE INVENTION

Four examples are provided. All examples satisfy the general description provided above as well as the parametric equations 2-9. A summary table of the four examples is provided in Table 1 below.

TABLE 1

Summary table of Examples 1-4.

|  | Example 1 | Example 2 | Example 3 | Example 4 |
|---|---|---|---|---|
| F | 4.72 | 9.7 | 9.7 | 4.71 |
| F1 | 5.4 | 15.127 | 13.788 | 5.418 |
| F2 | 15.8 | 18.531 | 21.674 | 16.494 |
| TTL | 7.7 | 14.936 | 14.74 | 7.6 |
| IH | 4 | 8 | 7.964 | 3.875 |
| Equation (2) F1/F | 1.14 | 1.56 | 1.42 | 1.15 |
| Equation (3) F2/F | 3.35 | 1.91 | 2.23 | 3.50 |
| Equation (9) TTL/IH | 1.93 | 1.87 | 1.85 | 1.96 |

The radius of curvature in all examples is measured at the point on the lens intersecting the optical axis. The description of the lens elements as flat, convex or concave refers to the curvature at the point on the lens surface that intersects the optical axis. The term lens refers to the lens system that is comprised of a plurality of lens elements. Each lens element by itself is also known in the literature as a lens. Here, lens may refer to the multi-component system or an individual lens element within the lens system. In all cases the meaning will be clear from context and from reference numbers.

Figure 1:
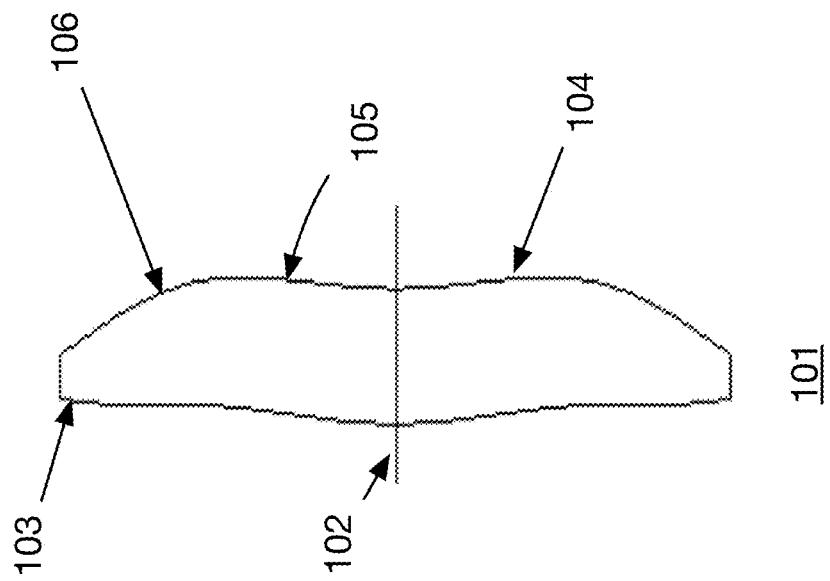
FIG. 1 is a diagram of a complex aspheric lens element.

Referring to FIG. 1, one of the aspheric elements of Group 2 has a complex surface profile. The definition of a complex aspheric surface is that the local surface derivative changes sign at least once going from center to the edge of the lens element. In FIG. 1 the surface 104 of the lens element 101 is a complex aspherical surface. In traversing from the center 102 to the edge 103 the local surface derivative of surface 104 changes sign. The sign of the local surface derivative at point 105 is opposite that for the point 106. In preferred embodiment the complex aspheric surface is the last optically powered surface facing the image plane (not including any flat filter or sensor cover glass).

Figure 2:
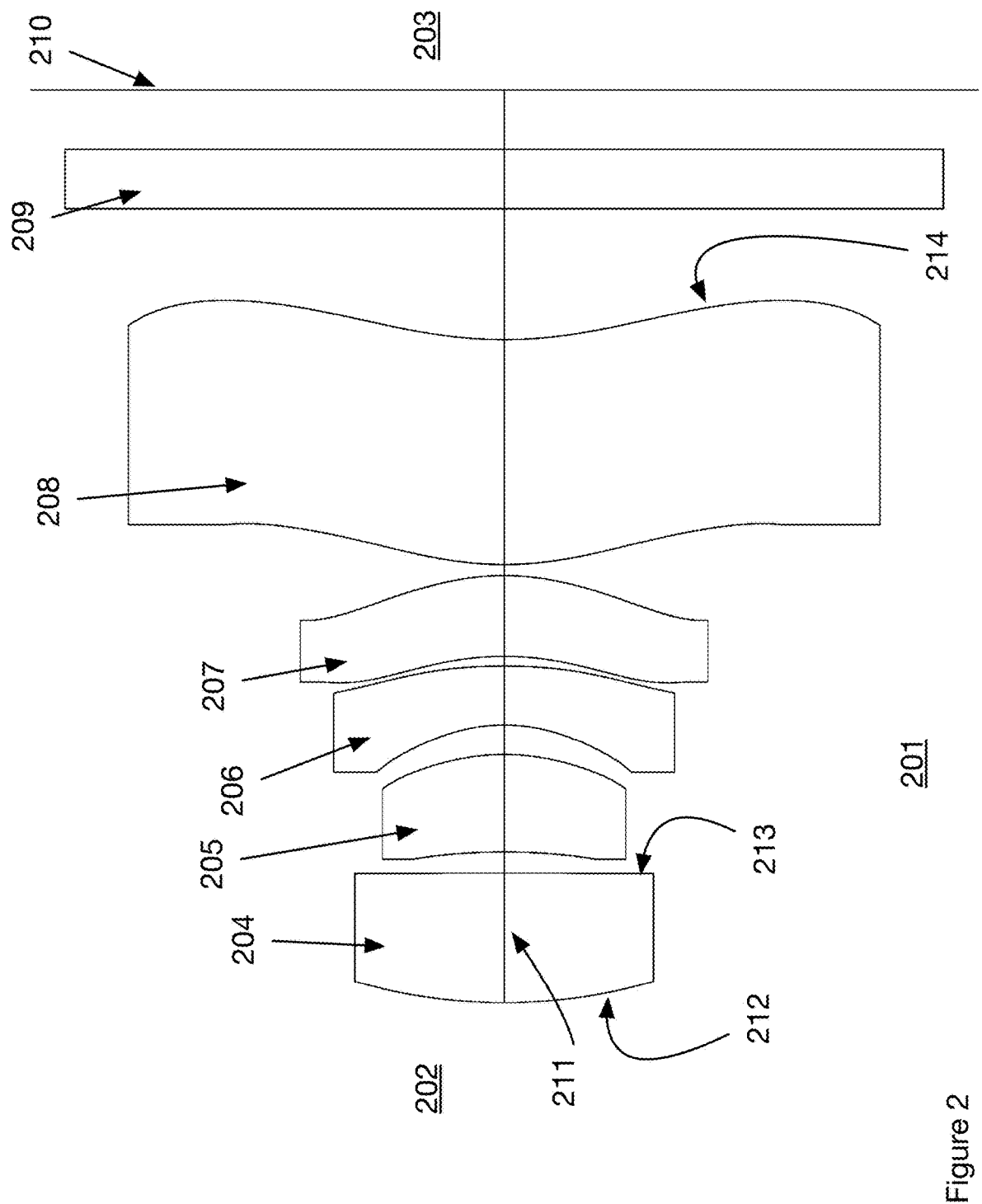
FIG. 2 is a diagram of a first embodiment of the compact high performance lens.

A first example embodiment 201 of the invented lens system is shown in FIG. 2. The design has a field angle of +/−40° for a total field of view of 80°, with a relative aperture of F/2.8. Lens elements 204-208 are arranged from object 202 to image 203 along the optical axis 211. Group 1 has positive power and consists of a single lens element 204. In the preferred embodiment the lens element of Group 1 is made of a thermally stable glass material and Equation 11 is satisfied. Group 2 also has positive power and is comprised of four aspheric lens elements 205-208. A cover glass 209 is placed in front of the image plane 210. An image sensor (not shown) would be located at the image plane. Details of the construction of Example 1 are shown in Tables 2 and 3. In the tables the surfaces of the lens elements are numbered consecutively 1, 2, . . . from object to image. The first surface 212 is S1, and, the second surface 213 is S2, etc. The last surface 214 is S10 and is a complex aspherical surface. In this example the Abbe number of the last element 208 is 56. The conditional relationship of Equation 8 is satisfied. The second surface is labeled STO as the aperture stop. The aperture stop physically may be any of:
1. Paint a black ring on the STOP surface to define the clear aperture for that surface.
2. Insert a thin aperture after the STOP surface.
3. Use a spacer with the appropriate ID to function as the STOP between surface 2 and 3.
4. Or any other methods for forming a STOP as required by optical prescriptions.

Table 2 gives material and dimensional properties for each lens element and Table 3 gives the aspheric parameters according to equation 1 for the aspheric surfaces of Group 2.

TABLE 2

Optical Prescription for Example 1.

| Surface | Type | Radius | Thickness | Nd | Abbe # | Diameter | Conic |
|---|---|---|---|---|---|---|---|
| 1 | STANDARD | 4.49 | 1.10 | 1.80 | 46.57 | 2.52 | 0 |
| STO | STANDARD | −151.39 | 0.18 | | | 1.52 | 0.00 |
| 3 | ASPHERE | −5.27 | 0.82 | 1.54 | 56.04 | 1.54 | 0 |
| 4 | ASPHERE | −1.85 | 0.25 | | | 2.06 | 0.99 |
| 5 | ASPHERE | −1.36 | 0.50 | 1.64 | 23.91 | 2.16 | 0 |
| 6 | ASPHERE | −4.58 | 0.08 | | | 2.89 | 0.00 |
| 7 | ASPHERE | −2.44 | 0.68 | 1.54 | 56.00 | 3.04 | 0 |
| 8 | ASPHERE | −2.11 | 0.09 | | | 3.45 | 0.00 |
| 9 | ASPHERE | 2.75 | 1.90 | 1.54 | 56.00 | 4.70 | 0 |
| 10 | ASPHERE | 3.60 | 1.11 | | | 6.35 | 0.00 |
| 11 | STANDARD | Infinity | 0.50 | 1.52 | 64.21 | 7.14 | 0 |
| 12 | STANDARD | Infinity | 0.50 | | | 7.42 | 0.00 |
| IMA | STANDARD | Infinity | | | | 8.01 | 0.00 |

TABLE 3

Aspheric Coefficients for Example 1

Surface 3

| | | |
|---|---|---|
| Coefficient on $r^2$ | : | 0 |
| Coefficient on $r^4$ | : | −0.0023403382 |
| Coefficient on $r^6$ | : | −0.016744966 |
| Coefficient on $r^8$ | : | 0 |
| Coefficient on $r^{10}$ | : | 0 |
| Coefficient on $r^{12}$ | : | 0 |
| Coefficient on $r^{14}$ | : | 0 |
| Coefficient on $r^{16}$ | : | 0 |

Surface 4

| | | |
|---|---|---|
| Coefficient on $r\,2$ | : | 0 |
| Coefficient on $r^4$ | : | 0.07994329 |
| Coefficient on $r^6$ | : | −0.026022925 |
| Coefficient on $r^8$ | : | 0 |
| Coefficient on $r^{10}$ | : | 0 |
| Coefficient on $r^{12}$ | : | 0 |
| Coefficient on $r^{14}$ | : | 0 |
| Coefficient on $r^{16}$ | : | 0 |

Surface 5

| | | |
|---|---|---|
| Coefficient on $r^2$ | : | 0 |
| Coefficient on $r^4$ | : | 0.10686134 |
| Coefficient on $r^6$ | : | −0.0054801604 |
| Coefficient on $r^8$ | : | −0.0013555713 |
| Coefficient on $r^{10}$ | : | 0 |
| Coefficient on $r^{12}$ | : | 0 |
| Coefficient on $r^{14}$ | : | 0 |
| Coefficient on $r^{16}$ | : | 0 |

Surface 6

| | | |
|---|---|---|
| Coefficient on $r^2$ | : | 0 |
| Coefficient on $r^4$ | : | −0.05001744 |
| Coefficient on $r^6$ | : | 0.03975641 |
| Coefficient on $r^8$ | : | −0.0073807262 |
| Coefficient on $r^{10}$ | : | 0 |

TABLE 3-continued

Aspheric Coefficients for Example 1

| | | |
|---|---|---|
| Coefficient on $r^{12}$ | : | 0 |
| Coefficient on $r^{14}$ | : | 0 |
| Coefficient on $r^{16}$ | : | 0 |

Surface 7

| | | |
|---|---|---|
| Coefficient on $r^2$ | : | 0 |
| Coefficient on $r^4$ | : | 0.019463696 |
| Coefficient on $r^6$ | : | 0.032160237 |
| Coefficient on $r^8$ | : | −0.0079977617 |
| Coefficient on $r^{10}$ | : | 0.00063561461 |
| Coefficient on $r^{12}$ | : | 0 |
| Coefficient on $r^{14}$ | : | 0 |
| Coefficient on $r^{16}$ | : | 0 |

Surface 8

| | | |
|---|---|---|
| Coefficient on $r^2$ | : | 0 |
| Coefficient on $r^4$ | : | 0.043125419 |
| Coefficient on $r^6$ | : | 0.0031940326 |
| Coefficient on $r^8$ | : | 70.00028212694 |
| Coefficient on $r^{10}$ | : | 0.00032367251 |
| Coefficient on $r^{12}$ | : | 0 |
| Coefficient on $r^{14}$ | : | 0 |
| Coefficient on $r^{16}$ | : | 0 |

Surface 9

| | | |
|---|---|---|
| Coefficient on $r^2$ | : | 0 |
| Coefficient on $r^4$ | : | −0.041392588 |
| Coefficient on $r^6$ | : | 0.0023850014 |
| Coefficient on $r^8$ | : | 0.00013702286 |
| Coefficient on $r^{10}$ | : | −4.8939602e-005 |
| Coefficient on $r^{12}$ | : | 0 |
| Coefficient on $r^{14}$ | : | 0 |
| Coefficient on $r^{16}$ | : | 0 |

Surface 10

| | | |
|---|---|---|
| Coefficient on $r^2$ | : | 0 |
| Coefficient on $r^4$ | : | −0.020485567 |
| Coefficient on $r^6$ | : | 0.00031741899 |
| Coefficient on $r^8$ | : | 7.0234434e-005 |
| Coefficient on $r^{10}$ | : | −7.2682631e-006 |
| Coefficient on $r^{12}$ | : | 0 |
| Coefficient on $r^{14}$ | : | 0 |
| Coefficient on $r^{16}$ | : | 0 |

Figure 3:
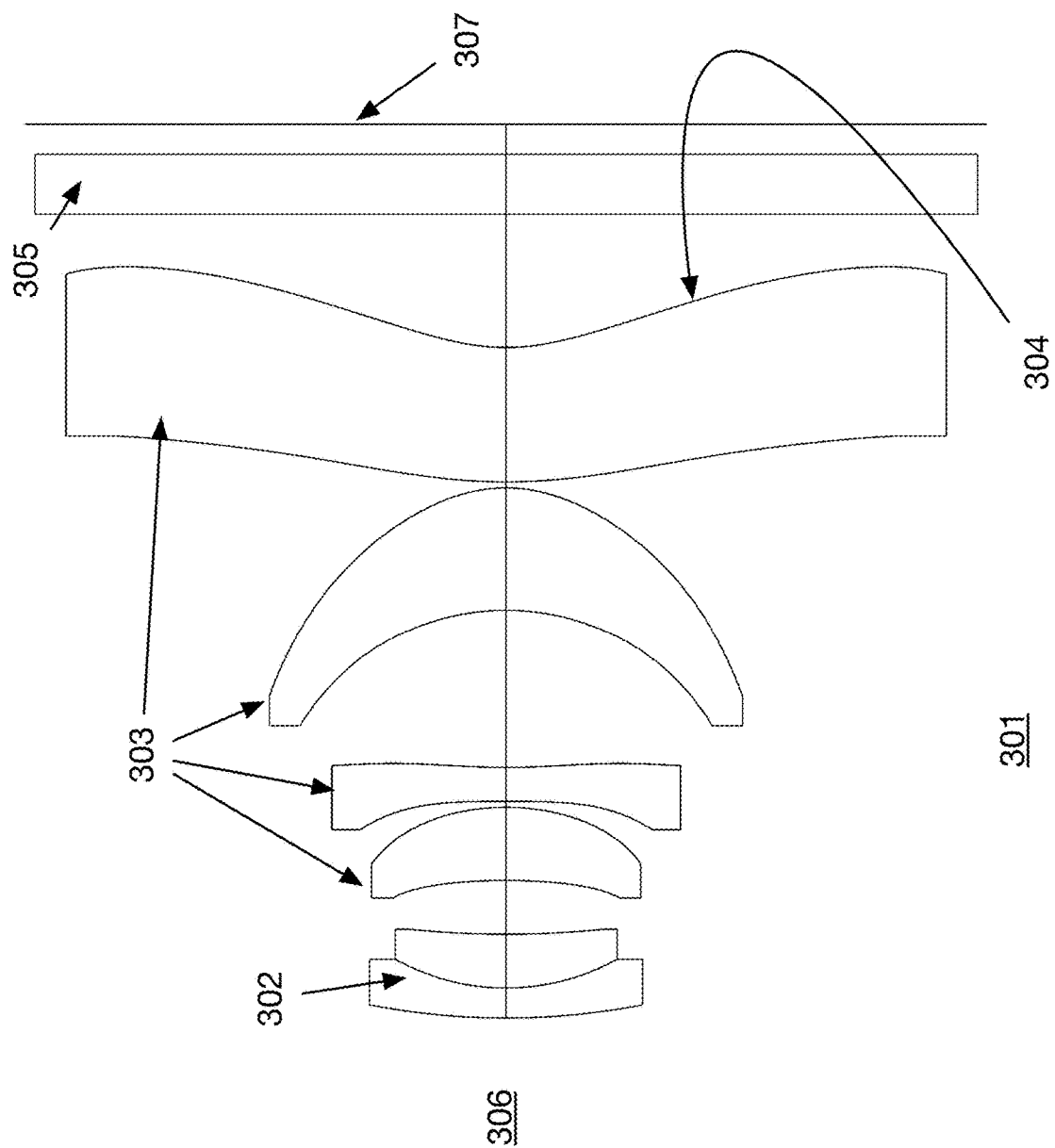
FIG. 3 is a diagram of a second embodiment of the compact high performance lens.

FIG. 3 shows a second example design. The design has a field angle of +/−40° for a total field of view of 80°, with a relative aperture of F/2.8. The lens 301 is comprised of two lens groups 302, 303. The lens groups are arranged from object 306 to image 307 along the optical axis (not labeled). The first lens group 302 has positive power and is comprised of a cemented doublet. In the preferred embodiment the first lens group is made of thermally stable glass material and Equation 11 is satisfied. The second lens group 303 has positive power and is comprised of four aspheric lens elements. The last surface 304 before the image plane is a complex aspheric surface. A Filter/cover 305 is also shown. The detailed parameters for construction of this Example 2 are shown in Tables 4 and 5. The general description of the invented lens as well as the parametric equations 2-9 are satisfied. Table 4 gives material and dimensional properties for each lens element and Table 5 gives the aspheric parameters according to equation 1 for the aspheric surfaces of Group 2.

TABLE 4

Optical Prescription for Example 2.

| Surface | Type | Radius | Thickness | Nd | Abbe # | Diameter | Conic |
|---|---|---|---|---|---|---|---|
| 1 | STANDARD | 11.85 | 0.50 | 1.55 | 45.83 | 4.54 | 0.00 |
| 2 | STANDARD | 3.79 | 0.90 | 1.80 | 46.57 | 3.70 | 0.00 |
| STO | STANDARD | 15.91 | 0.91 | | | 3.27 | 0.00 |
| 4 | ASPHERE | −9.79 | 1.22 | 1.54 | 56.04 | 3.76 | 20.97 |
| 5 | ASPHERE | −3.80 | 0.10 | | | 4.48 | 1.39 |
| 6 | ASPHERE | −34.55 | 0.56 | 1.64 | 23.91 | 4.86 | 113.02 |
| 7 | ASPHERE | 10.85 | 2.63 | | | 5.80 | −61.94 |
| 8 | ASPHERE | −3.93 | 2.04 | 1.54 | 56.04 | 6.86 | −5.21 |
| 9 | ASPHERE | −2.46 | 0.10 | | | 7.88 | −2.59 |
| 10 | ASPHERE | 8.92 | 2.25 | 1.64 | 23.91 | 13.00 | −0.57 |
| 11 | ASPHERE | 3.37 | 2.22 | | | 14.65 | −6.97 |
| 12 | STANDARD | Infinity | 1.00 | 1.52 | 64.21 | 15.28 | 0.00 |
| 13 | STANDARD | Infinity | 0.50 | | | 15.69 | 0.00 |
| IMA | STANDARD | Infinity | | | | 16.01 | 0.00 |

TABLE 5

Aspheric Coefficients for Example 2

Surface 4

| | | |
|---|---|---|
| Coefficient on r^2 | : | 0 |
| Coefficient on r^4 | : | −0.00013388074 |
| Coefficient on r^6 | : | −0.00062554259 |
| Coefficient on r^8 | : | 6.5883982e−005 |
| Coefficient on r^10 | : | −3.1870733e−005 |
| Coefficient on r^12 | : | 0 |
| Coefficient on r^14 | : | 0 |
| Coefficient on r^16 | : | 0 |

Surface 5

| | | |
|---|---|---|
| Coefficient on r^2 | : | 0 |
| Coefficient on r^4 | : | 0.001584084 |
| Coefficient on r^6 | : | −0.00067800683 |
| Coefficient on r^8 | : | 7.483674e−005 |
| Coefficient on r^10 | : | −4.6341946e−006 |
| Coefficient on r^12 | : | 0 |
| Coefficient on r^14 | : | 0 |
| Coefficient on r^16 | : | 0 |

Surface 6

| | | |
|---|---|---|
| Coefficient on r^2 | : | 0 |
| Coefficient on r^4 | : | −0.012844556 |
| Coefficient on r^6 | : | 0.00060002378 |
| Coefficient on r^8 | : | −9.8786595e−005 |
| Coefficient on r^10 | : | 1.0470692e−005 |
| Coefficient on r^12 | : | 0 |
| Coefficient on r^14 | : | 0 |
| Coefficient on r^16 | : | 0 |

Surface 7

| | | |
|---|---|---|
| Coefficient on r^2 | : | 0 |
| Coefficient on r^4 | : | −0.0053916308 |
| Coefficient on r^6 | : | 0.00028279929 |
| Coefficient on r^8 | : | 3.7008355e−006 |
| Coefficient on r^10 | : | −1.9628709e−007 |
| Coefficient on r^12 | : | 0 |
| Coefficient on r^14 | : | 0 |
| Coefficient on r^16 | : | 0 |

Surface 8

| | | |
|---|---|---|
| Coefficient on r^2 | : | 0 |
| Coefficient on r^4 | : | −0.0082287445 |
| Coefficient on r^6 | : | 0.00049065523 |
| Coefficient on r^8 | : | −5.0693866e−005 |
| Coefficient on r^10 | : | 1.6028817e−006 |
| Coefficient on r^12 | : | 0 |
| Coefficient on r^14 | : | 0 |
| Coefficient on r^16 | : | 0 |

Surface 9

| | | |
|---|---|---|
| Coefficient on r^2 | : | 0 |
| Coefficient on r^4 | : | −0.0061083178 |
| Coefficient on r^6 | : | 0.00015684374 |
| Coefficient on r^8 | : | −9.2757524e−006 |
| Coefficient on r^10 | : | −1.3021108e−007 |
| Coefficient on r^12 | : | 0 |
| Coefficient on r^14 | : | 0 |
| Coefficient on r^16 | : | 0 |

Surface 10

| | | |
|---|---|---|
| Coefficient on r^2 | : | 0 |
| Coefficient on r^4 | : | −0.0022317463 |
| Coefficient on r^6 | : | 5.1843845e−005 |
| Coefficient on r^8 | : | −6.4748563e−007 |
| Coefficient on r^10 | : | 2.8167057e−009 |
| Coefficient on r^12 | : | 0 |
| Coefficient on r^14 | : | 0 |
| Coefficient on r^16 | : | 0 |

Surface 11

| | | |
|---|---|---|
| Coefficient on r^2 | : | 0 |
| Coefficient on r^4 | : | −0.00070370539 |
| Coefficient on r^6 | : | 7.2156149e−006 |
| Coefficient on r^8 | : | 9.6881565e−009 |
| Coefficient on r^10 | : | −9.7144714e−010 |
| Coefficient on r^12 | : | 0 |
| Coefficient on r^14 | : | 0 |
| Coefficient on r^16 | : | 0 |

Figure 4:
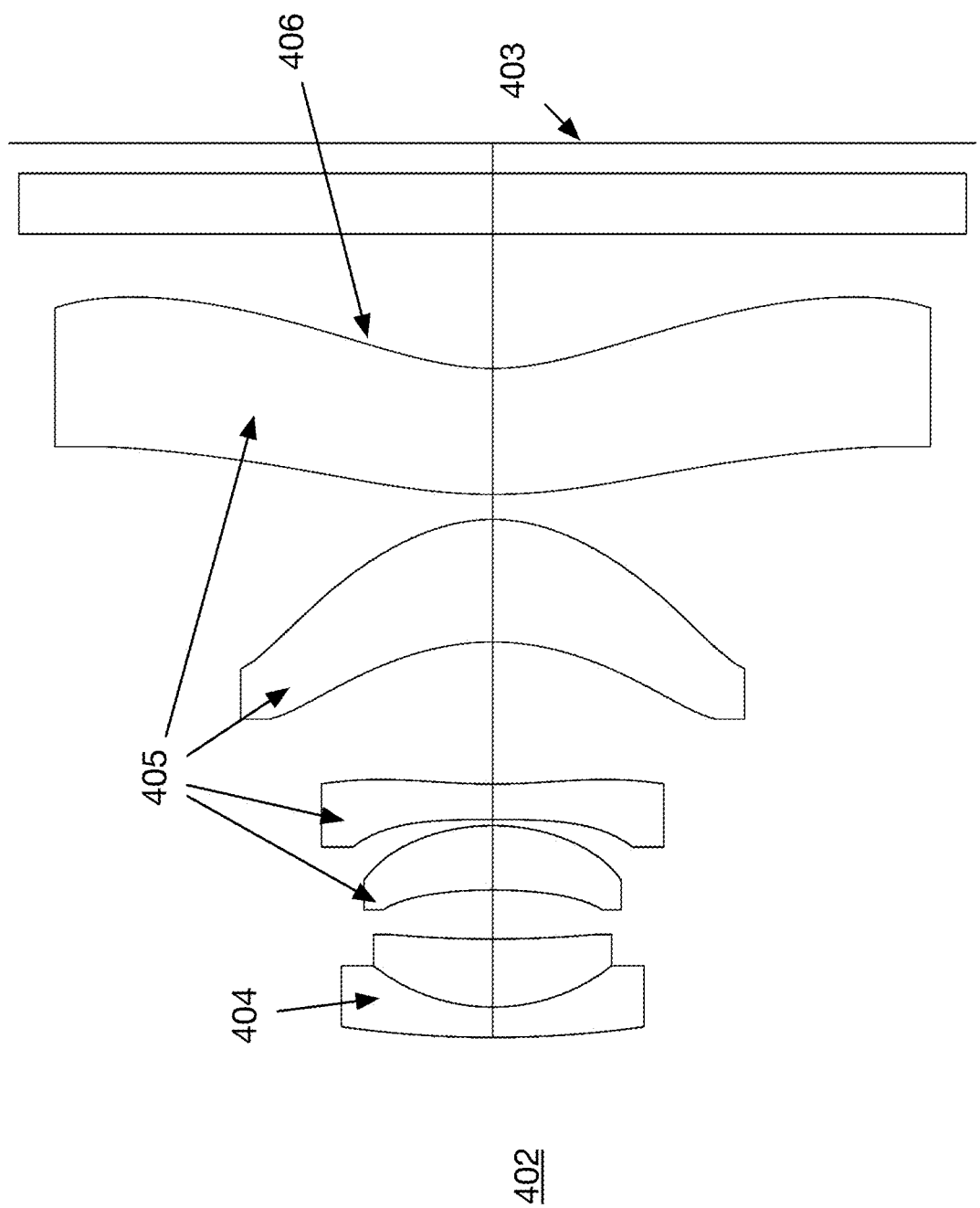
FIG. 4 is a diagram of a third embodiment of the compact high performance lens.

FIG. 4 shows a third example design. The design has a field angle of +/−40° for a total field of view of 80°, with a relative aperture of F/2.7. The lens 401 is comprised of two lens groups 404, 405. The lens groups are arranged from object 402 to image 403 along the optical axis (not labeled). The first lens group 404 has positive power and is comprised of a cemented doublet. In the preferred embodiment the first lens group is made of thermally stable glass material and Equation 11 is satisfied. The second lens group 405 has positive power and is comprised of four aspheric lens elements. The last surface 406 before the image plane is a complex aspheric surface. A Filter/cover (not labeled) is also shown. The detailed parameters for construction of this Example 3 are shown in Tables 6 and 7. The general description of the invented lens as well as the parametric equations 2-9 are satisfied. Table 6 gives material and dimensional properties for each lens element and Table 7 gives the aspheric parameters according to equation 1 for the aspheric surfaces of Group 2.

TABLE 6

Optical Prescription for Example 3.

| Surface | Type | Radius | Thickness | Nd | Abbe # | Diameter | Conic |
|---|---|---|---|---|---|---|---|
| 1 | STANDARD | 17.70 | 0.50 | 1.55 | 45.83 | 4.99 | 0.00 |
| 2 | STANDARD | 3.17 | 1.12 | 1.80 | 46.57 | 3.92 | 0.00 |
| STO | STANDARD | 19.10 | 0.81 | | | 3.38 | 0.00 |
| 4 | ASPHERE | −7.72 | 1.06 | 1.54 | 56.04 | 3.61 | 14.37 |
| 5 | ASPHERE | −3.41 | 0.10 | | | 4.24 | 1.21 |
| 6 | ASPHERE | −34.61 | 0.58 | 1.64 | 23.91 | 4.60 | 200.00 |
| 7 | ASPHERE | 9.62 | 2.34 | | | 5.64 | −39.51 |
| 8 | ASPHERE | −4.10 | 2.02 | 1.54 | 56.04 | 7.37 | −5.01 |
| 9 | ASPHERE | −2.73 | 0.41 | | | 8.30 | −2.64 |
| 10 | ASPHERE | 8.73 | 2.08 | 1.63 | 23.33 | 12.93 | −1.49 |
| 11 | ASPHERE | 3.86 | 2.22 | | | 14.42 | −7.19 |
| 12 | STANDARD | Infinity | 1.00 | 1.52 | 64.21 | 15.19 | 0.00 |
| 13 | STANDARD | Infinity | 0.50 | | | 15.61 | 0.00 |
| IMA | STANDARD | Infinity | | | | 15.93 | 0.00 |

TABLE 7

Aspheric Coefficients for Example 3.

Surface 4

| Coefficient on $r^2$ | : | 0 |
| Coefficient on $r^4$ | : | −0.00043891107 |
| Coefficient on $r^6$ | : | −0.000723717 |
| Coefficient on $r^8$ | : | 6.8737331e−005 |
| Coefficient on $r^{10}$ | : | −1.3713994e−005 |
| Coefficient on $r^{12}$ | : | 0 |
| Coefficient on $r^{14}$ | : | 0 |
| Coefficient on $r^{16}$ | : | 0 |

Surface 5

| Coefficient on $r^2$ | : | 0 |
| Coefficient on $r^4$ | : | 0.0037292849 |
| Coefficient on $r^6$ | : | −0.0010246212 |
| Coefficient on $r^8$ | : | 0.00020654412 |
| Coefficient on $r^{10}$ | : | −1.07682e−005 |
| Coefficient on $r^{12}$ | : | 0 |
| Coefficient on $r^{14}$ | : | 0 |
| Coefficient on $r^{16}$ | : | 0 |

Surface 6

| Coefficient on $r^2$ | : | 0 |
| Coefficient on $r^4$ | : | −0.013022756 |
| Coefficient on $r^6$ | : | 0.00030444481 |
| Coefficient on $r^8$ | : | 1.3274255e−005 |
| Coefficient on $r^{10}$ | : | −6.7301907e−006 |
| Coefficient on $r^{12}$ | : | 0 |
| Coefficient on $r^{14}$ | : | 0 |
| Coefficient on $r^{16}$ | : | 0 |

Surface 7

| Coefficient on $r^2$ | : | 0 |
| Coefficient on $r^4$ | : | −0.0071703327 |
| Coefficient on $r^6$ | : | 0.00063653017 |
| Coefficient on $r^8$ | : | −5.2627208e−005 |
| Coefficient on $r^{10}$ | : | 2.4759742e−006 |
| Coefficient on $r^{12}$ | : | 0 |
| Coefficient on $r^{14}$ | : | 0 |
| Coefficient on $r^{16}$ | : | 0 |

Surface 8

| Coefficient on $r^2$ | : | 0 |
| Coefficient on $r^4$ | : | −0.0051159171 |
| Coefficient on $r^6$ | : | 0.00043105519 |
| Coefficient on $r^8$ | : | −2.0327949e−005 |
| Coefficient on $r^{10}$ | : | 7.9098197e−007 |
| Coefficient on $r^{12}$ | : | 0 |
| Coefficient on $r^{14}$ | : | 0 |
| Coefficient on $r^{16}$ | : | 0 |

TABLE 7-continued

Aspheric Coefficients for Example 3.

Surface 9

| Coefficient on $r^2$ | : | 0 |
| Coefficient on $r^4$ | : | −0.0046237673 |
| Coefficient on $r^6$ | : | 0.0002026819 |
| Coefficient on $r^8$ | : | −1.0252988e−005 |
| Coefficient on $r^{10}$ | : | 4.9744619e−007 |
| Coefficient on $r^{12}$ | : | 0 |
| Coefficient on $r^{14}$ | : | 0 |
| Coefficient on $r^{16}$ | : | 0 |

Surface 10

| Coefficient on $r^2$ | : | 0 |
| Coefficient on $r^4$ | : | −0.0020329598 |
| Coefficient on $r^6$ | : | 5.064932e−005 |
| Coefficient on $r^8$ | : | −6.6454445e−007 |
| Coefficient on $r^{10}$ | : | 3.2773772e−009 |
| Coefficient on $r^{12}$ | : | 0 |
| Coefficient on $r^{14}$ | : | 0 |
| Coefficient on $r^{16}$ | : | 0 |

Surface 11

| Coefficient on $r^2$ | : | 0 |
| Coefficient on $r^4$ | : | −0.0007864275 |
| Coefficient on $r^6$ | : | 9.0891742e−006 |
| Coefficient on $r^8$ | : | −3.2544574e−008 |
| Coefficient on $r^{10}$ | : | −6.8237577e−010 |
| Coefficient on $r^{12}$ | : | 0 |
| Coefficient on $r^{14}$ | : | 0 |
| Coefficient on $r^{16}$ | : | 0 |

Figure 5:
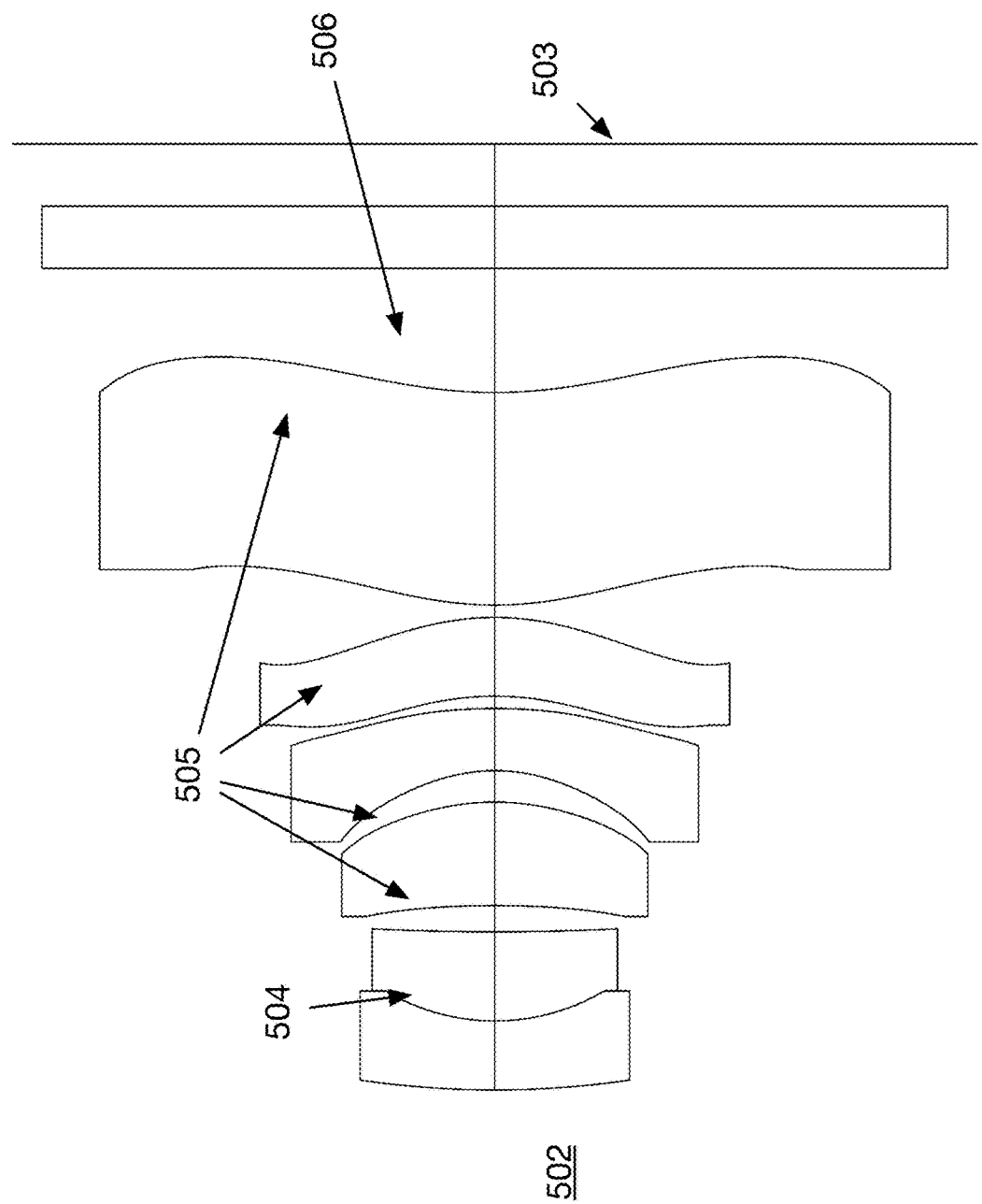
FIG. 5 is a diagram of a fourth embodiment of the compact high performance lens.

FIG. 5 shows a fourth example design. The design has a field angle of +/−40° for a total field of view of 80°, with a relative aperture of F/2.8. The lens 501 is comprised of two lens groups 504, 505. The lens groups are arranged from object 502 to image 503 along the optical axis (not labeled). The first lens group 504 has positive power and is comprised of a cemented doublet. In the preferred embodiment the first lens group is made of thermally stable glass material and Equation 11 is satisfied. The second lens group 505 has positive power and is comprised of four aspheric lens elements. The last surface 506 before the image plane is a complex aspheric surface. A Filter/cover (not labeled) is also shown. The detailed parameters for construction of this Example 4 are shown in Tables 8 and 9. The general description of the invented lens as well as the parametric equations 2-9 are satisfied. Table 8 gives material and dimensional properties for each lens element and Table 9 gives the aspheric parameters according to equation 1 for the aspheric surfaces of Group 2.

TABLE 8

Optical Prescription for Example 4.

| Surface | Type | Radius | Thickness | Nd | Abbe # | Diameter | Conic |
|---|---|---|---|---|---|---|---|
| 1 | STANDARD | 7.44 | 0.55 | 1.55 | 45.83 | 2.17 | 0.00 |
| STO | STANDARD | 1.72 | 0.72 | 1.80 | 46.57 | 1.76 | 0.00 |
| 3 | STANDARD | 20.49 | 0.21 | | | 1.97 | 0.00 |
| 4 | ASPHERE | −7.64 | 0.83 | 1.54 | 56.11 | 2.07 | 0.00 |
| 5 | ASPHERE | −1.96 | 0.25 | | | 2.46 | 0.94 |
| 6 | ASPHERE | −1.38 | 0.50 | 1.64 | 23.91 | 2.48 | 0.00 |
| 7 | ASPHERE | −4.54 | 0.10 | | | 3.27 | 0.00 |
| 8 | ASPHERE | −2.28 | 0.63 | 1.54 | 56.00 | 3.47 | 0.00 |
| 9 | ASPHERE | −2.12 | 0.10 | | | 3.77 | 0.00 |
| 10 | ASPHERE | 2.75 | 1.71 | 1.54 | 56.11 | 4.87 | 0.00 |
| 11 | ASPHERE | 3.64 | 1.00 | | | 6.35 | 0.00 |
| 12 | STANDARD | Infinity | 0.50 | 1.52 | 64.21 | 7.05 | 0.00 |
| 13 | STANDARD | Infinity | 0.50 | | | 7.28 | 0.00 |
| IMA | STANDARD | Infinity | | | | 7.75 | 0.00 |

TABLE 9

Aspheric Coefficients for Example 4.

Surface 4

| | | |
|---|---|---|
| Coefficient on r^2 | : | 0 |
| Coefficient on r^4 | : | −0.010472063 |
| Coefficient on r^6 | : | −0.0046103523 |
| Coefficient on r^8 | : | 0 |
| Coefficient on r^10 | : | 0 |
| Coefficient on r^12 | : | 0 |
| Coefficient on r^14 | : | 0 |
| Coefficient on r^16 | : | 0 |

Surface 5

| | | |
|---|---|---|
| Coefficient on r^2 | : | 0 |
| Coefficient on r^4 | : | 0.064445091 |
| Coefficient on r^6 | : | −0.013653874 |
| Coefficient on r^8 | : | 0 |
| Coefficient on r^10 | : | 0 |
| Coefficient on r^12 | : | 0 |
| Coefficient on r^14 | : | 0 |
| Coefficient on r^16 | : | 0 |

Surface 6

| | | |
|---|---|---|
| Coefficient on r^2 | : | 0 |
| Coefficient on r^4 | : | 0.086328415 |
| Coefficient on r^6 | : | 0.0017266757 |
| Coefficient on r^8 | : | −0.0025175548 |
| Coefficient on r^10 | : | 0 |
| Coefficient on r^12 | : | 0 |
| Coefficient on r^14 | : | 0 |
| Coefficient on r^16 | : | 0 |

Surface 7

| | | |
|---|---|---|
| Coefficient on r^2 | : | 0 |
| Coefficient on r^4 | : | −0.053767335 |
| Coefficient on r^6 | : | 0.041974087 |
| Coefficient on r^8 | : | −0.0080842162 |
| Coefficient on r^10 | : | 0 |
| Coefficient on r^12 | : | 0 |
| Coefficient on r^14 | : | 0 |
| Coefficient on r^16 | : | 0 |

Surface 8

| | | |
|---|---|---|
| Coefficient on r^2 | : | 0 |
| Coefficient on r^4 | : | 0.03251816 |
| Coefficient on r^6 | : | 0.025757096 |
| Coefficient on r^8 | : | −0.0066475856 |
| Coefficient on r^10 | : | 0.00046911613 |
| Coefficient on r^12 | : | 0 |
| Coefficient on r^14 | : | 0 |
| Coefficient on r^16 | : | 0 |

Surface 9

| | | |
|---|---|---|
| Coefficient on r^2 | : | 0 |
| Coefficient on r^4 | : | 0.046673909 |
| Coefficient on r^6 | : | 0.0022675323 |
| Coefficient on r^8 | : | −0.00046164877 |
| Coefficient on r^10 | : | 0.00029628899 |
| Coefficient on r^12 | : | 0 |
| Coefficient on r^14 | : | 0 |
| Coefficient on r^16 | : | 0 |

Surface 10

| | | |
|---|---|---|
| Coefficient on r^2 | : | 0 |
| Coefficient on r^4 | : | −0.045803002 |
| Coefficient on r^6 | : | 0.003503187 |
| Coefficient on r^8 | : | 2.7647228e−006 |
| Coefficient on r^10 | : | −4.2747773e−005 |
| Coefficient on r^12 | : | 0 |
| Coefficient on r^14 | : | 0 |
| Coefficient on r^16 | : | 0 |

Surface 11

| | | |
|---|---|---|
| Coefficient on r^2 | : | 0 |
| Coefficient on r^4 | : | −0.023311846 |
| Coefficient on r^6 | : | 0.00080385382 |
| Coefficient on r^8 | : | 3.8510986e−005 |
| Coefficient on r^10 | : | −6.7909649e−006 |
| Coefficient on r^12 | : | 0 |

TABLE 9-continued

Aspheric Coefficients for Example 4.

| | | |
|---|---|---|
| Coefficient on r^14 | : | 0 |
| Coefficient on r^16 | : | 0 |

SUMMARY

A thermally stable, compact, wide angle lens design has been described. The lens is comprised of two lens groups. The first group, nearest the object, has positive power and provides most of the focusing power of the entire lens assembly. The first group is made of either a single lens element or a doublet. The positively powered lens element in group 1 is made of thermally stable materials such as optical glasses. The second lens group is comprised of four aspheric lens elements. The image surface of the last element, nearest the image plane, is a complex aspherical surface. The lens design satisfies a list of 8 parametric equations.

I claim:

1. An optical lens, said lens having an effective focal length, an object end, a field of view, a f-number, a total track length, an image height at maximum field, an optical axis, and, an image plane, and, said optical lens comprising:
   a. two lens groups located along the optical axis in order from object end to image plane, each lens group having an effective focal length, and,
   b. the lens groups comprising:
      i. group 1 having positive power, an effective focal length, a refractive index, and, comprised of either a single lens element or a doublet lens element, and,
      ii. group 2 having positive power, an effective focal length, and, comprising 4 aspheric lens elements, in order from nearest the object end to the image plane, a first lens element, a second lens element, a third lens element, and, a fourth lens element, each lens element made of material having a refractive index and an Abbe number, and, the fourth lens element of group 2 has a complex aspherical image surface, and,
   c. the focusing power of group 1 is greater than the focusing power of group 2.

2. The optical lens of claim 1 further satisfying the parametric equation:

$$TTL/IH < 2.5$$

where TTL is the total track length and IH is the image height at maximum field.

3. The optical lens of claim 1 further satisfying the parametric equation:

$$|dn/dT| 7 \times 10^{-6}/C$$

where |dn/dT| is the absolute value of the change in the refractive index (at d-line) of group 1 positive powered lens element per degree Centigrade in the temperature range of −20 to +60 C.

4. The optical lens of claim 3 wherein the lens elements of group 2 are all made of plastic.

5. The optical lens of claim 4 further satisfying the following equations:
   a. V21>55
   b. V22<30
   c. V23>55
   d. 20<V24<60 where V21 is the Abbe number of the first lens element of Group 2, V22 is the Abbe number of the second lens element of Group 2, V23 is the Abbe number of the third lens element of group 2, and, V24 is the Abbe number of the fourth lens element of group 2.

6. The optical lens of claim 1 further satisfying the following equations:
   a. $1 <= F1/F <= 1.8$
   b. $F2/F >= 1.8$
   where F is the effective focal length of the optical lens and F1 is the effective focal length of the first lens group and F2 is the effective focal length of the second lens group.

7. The optical lens of claim 6 further satisfying the parametric equation:

$$TTL/IH < 2.5$$

where TTL is the total track length and IH is the image height at maximum field.

8. The optical lens of claim 6 further satisfying the parametric equation:

$$|dn/dT| 7 \times 10^{-6}/C$$

where $|dn/dT|$ is the absolute value of the change in the refractive index (at d-line) of group 1 positive powered lens element per degree Centigrade in the temperature range of $-20$ to $+60$ C.

9. The optical lens of claim 8 wherein the lens elements of group 2 are all made of plastic.

10. An optical lens, said lens having an effective focal length, an object end, a field of view, a f-number, a total track length, an image height at maximum field, an optical axis, and, an image plane, and, said optical lens consisting of:
    a. two lens groups located along the optical axis in order from object end to image plane, each lens group having an effective focal length, and,
    b. the lens groups consisting of:
       i. group 1 having positive power, an effective focal length, a refractive index, and, consisting of either a single lens element or a doublet lens element, and,
       ii. group 2 having positive power, an effective focal length, and, consisting of 4 aspheric lens elements, in order from nearest the object end to the image plane, a first lens element, a second lens element, a third lens element, and, a fourth lens element, each lens element made of material having a refractive index and an Abbe number, and, the fourth lens element of group 2 has a complex aspherical image surface, and,
    c. the focusing power of group 1 is greater than the focusing power of group 2.

11. The optical lens of claim 10 further satisfying the parametric equation:

$$TTL/IH < 2.5$$

where TTL is the total track length and IH is the image height at maximum field.

12. The optical lens of claim 10 further satisfying the parametric equation:

$$|dn/dT| 7 \times 10^{-6}/C$$

where $|dn/dT|$ is the absolute value of the change in the refractive index (at d-line) of group 1 positive powered lens element per degree Centigrade in the temperature range of $-20$ to $+60$ C.

13. The optical lens of claim 12 wherein the lens elements of group 2 are all made of plastic.

14. The optical lens of claim 13 further satisfying the following equations:
    a. $V21 > 55$
    b. $V22 < 30$
    c. $V23 > 55$
    d. $20 < V24 < 60$
    where V21 is the Abbe number of the first lens element of Group 2, V22 is the Abbe number of the second lens element of Group 2, V23 is the Abbe number of the third lens element of group 2, and, V24 is the Abbe number of the fourth lens element of group 2.

15. The optical lens of claim 10 further satisfying the following equations:
    a. $1 <= F1/F <= 1.8$
    b. $F2/F >= 1.8$
    where F is the effective focal length of the optical lens and F1 is the effective focal length of the first lens group and F2 is the effective focal length of the second lens group.

16. The optical lens of claim 15 further satisfying the parametric equation:

$$TTL/IH < 2.5$$

where TTL is the total track length and IH is the image height at maximum field.

17. The optical lens of claim 16 further satisfying the parametric equation:

$$|dn/dT| 7 \times 10^{-6}/C$$

where $|dn/dT|$ is the absolute value of the change in the refractive index (at d-line) of group 1 positive powered lens element per degree Centigrade in the temperature range of $-20$ to $+60$ C.

18. The optical lens of claim 17 wherein the lens elements of group 2 are all made of plastic.

* * * * *